US006844049B2

(12) United States Patent
Amin-Javaheri

(10) Patent No.: US 6,844,049 B2
(45) Date of Patent: Jan. 18, 2005

(54) POLYVINYL CHLORIDE/WOOD COMPOSITE HAVING A NATURAL WOOD GRAIN FINISH AND A METHOD FOR CREATING THE FINISH

(76) Inventor: Hossein Amin-Javaheri, 762 Windbreak Trail, Houston, TX (US) 77079

( * ) Notice: Subject to any disclaimer, the term of this patent is extended or adjusted under 35 U.S.C. 154(b) by 36 days.

(21) Appl. No.: 10/283,698

(22) Filed: Oct. 30, 2002

(65) Prior Publication Data

US 2004/0086736 A1 May 6, 2004

(51) Int. Cl.[7] .................................................. B32B 5/12

(52) U.S. Cl. ......................... 428/151; 428/17; 428/105; 428/106; 428/114; 428/141; 428/195; 428/500; 428/507; 428/511; 428/532; 428/537.1; 427/267; 427/211; 427/280; 427/258; 427/286; 427/325; 427/324; 427/407.1; 427/408; 427/428

(58) Field of Search ................................ 427/267, 280, 427/211, 325, 256, 258, 286, 322, 324, 402, 428, 407.1, 408; 428/15, 17, 105, 106, 114, 141, 151, 195, 500, 507, 511, 532, 537.1

(56) References Cited

U.S. PATENT DOCUMENTS 6,083,601 A 7/2000 Prince et al.

*Primary Examiner*—Deborah Jones
*Assistant Examiner*—Wendy Boss

(57) ABSTRACT

An article made from polyvinyl chloride/wood composite having a natural wood grain finish and a method for creating the article. The natural wood grain finish is created on the article by applying multiple paint transfers onto the polyvinyl chloride/wood composite. The paint is transferred by a series of printing rollers having a wood grain pattern. Optionally, the polyvinyl chloride/wood composite can be painted with a base-coat of a hydrocarbon-based paint before applying the multiple paint transfers. This method is especially suited for manufacturing window blind slats.

16 Claims, No Drawings

POLYVINYL CHLORIDE/WOOD COMPOSITE HAVING A NATURAL WOOD GRAIN FINISH AND A METHOD FOR CREATING THE FINISH

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to articles made from polyvinyl chloride/wood composite having a natural wood grain finish and a method of creating the natural wood grain finish. More specifically, the present invention relates to polyvinyl chloride/wood composite window blind slats having a natural wood grain finish and to a method of applying the finish using a sequential application of paint to create a more decorative look to polyvinyl chloride/wood composite window blinds.

2. Description of the Related Art

Polyvinyl chloride/wood composite compounds are used to manufacture a variety of everyday household products, such as molding and horizontal window blind slats. The advantage that polyvinyl chloride/wood composite has over ordinary polyvinyl chloride is that the finished product looks and feels more like real wood than plastic. The most common way to manufacture such polyvinyl chloride/wood composite products is by the extrusion process. However, upon initial processing, these polyvinyl chloride/wood composites produce a material that has a uniform brownish color. Because this brownish color is usually not desired, especially in decorative items such as window blinds, a second manufacturing step is required in which the polyvinyl chloride/wood composite is covered with a thin layer of polyvinyl chloride in a co-extrusion process to give the desired color, usually white.

The present invention produces polyvinyl chloride/wood composite article, such as window blind slats, that have the look of natural or stained wood. The present invention actually enhances the brownish color of the polyvinyl chloride/wood composite and imparts a natural wood grain finish to the composite. There are significant economic advantages to creating a natural wood grain finish on polyvinyl chloride/wood composite because the material cost is substantially lower for polyvinyl chloride/wood composite than it is for real wood. Furthermore, this method of creating a natural wood grain finish on articles, such as window blind slats, made of polyvinyl chloride/wood composites offers distinct advantages over existing polyvinyl chloride/wood composite finishing methods.

SUMMARY OF THE INVENTION

The primary object of this invention is to provide an efficient, quick and inexpensive method of creating a natural wood grain finish on articles made from polyvinyl chloride/wood composite, such as window blind slats. This invention will be discussed in terms of window blind slats, but it should be understood that any article made from polyvinyl chloride/wood composite can be made to have the appearance of natural wood by using this invention. By way of example only, such articles include, but are not limited to molding, paneling, shutters, picture frames, and furniture.

The invention permits polyvinyl chloride/wood composite articles to be manufactured in an unlimited variety of natural wood grain shades by applying a series of paint transfers. The paint is hydrocarbon-based and is applied in sequential applications to the article. In the case of window blind slats, the slats are fed through multiple transfer stations, and each station adds a little more wood grain finish to the slat. Therefore, the manufacturer actually decides how many paint transfers to apply to the slat to achieve the desired look.

At least two transfers are needed to achieve a wood grain finish, and at least five transfers are preferred. Ten to twenty transfers are especially preferred. Because only a slight amount of hydrocarbon-based paint is applied by the transfer rollers, the paint dries quickly so even twenty coats can be applied efficiently. Optionally, the brownish background color of the polyvinyl chloride/wood composite can be altered by first painting it with a hydrocarbon-based paint prior to applying the paint transfers. By changing the background color, the manufacturer can produce a wider variety of wood grain finishes. Finally, the slat can be coated with a clear coat to give it the look of varnished wood. This clear coat can also provide protection from ultraviolet light and scratching of the wood grain finish.

BRIEF DESCRIPTION OF THE DRAWINGS

Not applicable.

DETAILED DESCRIPTION OF INVENTION

The present invention provides an improved, more efficient, and cost effective method for creating a natural wood grain finish on polyvinyl chloride/wood composite articles. Polyvinyl chloride/wood composites are well suited for the manufacture of window blinds and other similar products because the addition of wood powder changes the texture of the polyvinyl chloride so it looks and feels more like real wood. Additionally, window slats made of polyvinyl chloride/wood composite are substantially cheaper than slats made from real wood.

The disadvantage associated with this polyvinyl chloride/wood composite is that the wood powder imparts a uniform brownish color to the polyvinyl chloride. Some manufacturers use the polyvinyl chloride/wood composite by itself to make a brownish colored slat for use in window blinds. More often however, the brownish material is extruded as a substrate for further processing because brownish colored slats are not that popular. In a second step, the manufacturer puts a thin polyvinyl chloride layer over the entire substrate. Most often, this polyvinyl chloride layer is co-extruded with the polyvinyl chloride/wood composite as described in U.S. Pat. No. 6,083,601. Such products are usually white in color and give the illusion of painted wood. However, many decorators desire the look of natural wood grain which, up to now, has not been possible with the polyvinyl chloride/wood composite material.

This invention pertains to a method of creating a natural wood grain finish on polyvinyl chloride/wood composite window blinds. This finish can be achieved with or without a base-coat being applied to the polyvinyl chloride/wood composite. The preferred method does not use a base coat because that embodiment eliminates a processing step and is cheaper to produce. In the preferred embodiment, the brownish color of the polyvinyl chloride/wood composite forms the background color for the natural wood grain finish. Obviously, a slat without a base-coat does not have as many color variations as the embodiment with the base-coat.

In the preferred embodiment, the polyvinyl chloride/wood composite passes through a series of paint transfer stations that impart a natural wood grain finish. The paint is transferred with a printing roller having a wood grain pattern. The roller picks up paint from a source, such as a kiss coater, and applies it to the surface of the article. The paint should be quick drying because of the multiple applications needed to create the natural wood grain finish. Preferably, the slat will make one pass through a series of paint transfer rollers in an assembly line fashion. Of course, the slat could make multiple runs through a smaller line, but the handling requirement would make such a process less efficient.

The method requires at least two paint transfers from the printing roller, and a preferred method requires at least five transfers. The total number of paint transfers will vary according to the look that is desired. However, it should be noted that the natural wood grain finish becomes deeper and richer with each transfer. Since this natural wood grain finish is for esthetic purposes, each manufacturer must determine the exact number of paint transfers that create the look that they or their customers want. Typically, ten to twenty transfers are especially preferred for esthetic purposes.

The type of paint used to create the wood grain look is not critical so long as it is hydrocarbon-based. It is preferred that the paint be quick drying to improve the efficiency of the process. The paint that is transferred with the printing roller can be any color that contrasts with the background color of the slat. For example, a dark brown or black color would form dark lines on a lighter colored background to create the natural wood grain finish. Finally, the slat can be coated with a clear coat to give it the look of varnished wood. This clear coat can also provide protection from ultraviolet light and scratching of the wood grain finish.

The optional embodiment of this invention uses a hydrocarbon-based paint as a base-coat. In the method utilizing a base-coat, the slat is fed through a painting station wherein a base-coat is first applied to the slat. After this base-coat dries, a series of paint transfers is applied over the base-coat to impart a natural wood grain finish, just as it is done in the previously disclosed preferred embodiment. The color of this base-coat can be varied to simulate various types of natural wood, such as oak or bass, or to give the illusion of stained wood. Typically, colors ranging from beige to brown are suitable base-coats.

In accordance with this invention, articles made from polyvinyl chloride/wood composite, especially window blind slats, can be efficiently and economically finished to look like real wood. It will be obvious to those skilled in the art that the invention described here can be essentially duplicated by making minor changes in the material content or the method of manufacture. To the extent that such material or methods are substantially equivalent, it is intended that they be encompassed by the following claims.

I claim:

1. A method for creating a natural wood grain finish on articles made from polyvinyl chloride/wood composite comprising the steps of:

applying a contrasting hydrocarbon-based paint onto the article with a printing roller having a wood grain pattern; and, reapplying a contrasting hydrocarbon-based paint onto the article with a printing roller having a wood grain pattern to create the finish on the article.

2. The method of claim 1 wherein the paint is applied at least five times.

3. The method of claim 2 wherein the paint is applied from about ten to about twenty times.

4. The method of claim 1 wherein the article is a window blind slat.

5. The method of claim 4 wherein the paint is applied at least five times.

6. The method of claim 5 wherein the paint is applied from about ten to about twenty times.

7. A method for finishing an article made from polyvinyl chloride/wood composite comprising the steps of:

coating the article with a base-coat of hydrocarbon-based paint;

applying a contrasting hydrocarbon-based paint onto the base-coat with a printing roller having a wood grain pattern; and, reapplying a contrasting hydrocarbon-based paint onto the base-coat with a printing roller having a wood grain pattern to create the finish on the article.

8. The method of claim 7 wherein the paint is applied with the wood grain printing roller at least five times.

9. The method of claim 8 wherein the paint is applied with the wood grain printing roller from about ten to about twenty times.

10. The method of claim 7 wherein the article is a window blind slat.

11. The method of claim 10 wherein the paint is applied with the wood grain printing roller at least five times.

12. The method of claim 11 wherein the paint is applied with the wood grain printing roller from about ten to about twenty times.

13. An article comprising a polyvinyl chloride/wood composite with a natural wood grain pattern painted on the article to simulate real wood, the article being made by the method of claim 1.

14. The article of claim 13 wherein the article is a window blind slat.

15. An article comprising a polyvinyl chloride/wood composite with a base-coat of hydrocarbon-based paint and having a natural wood grain pattern painted on the base-coat to simulate real wood, the article being made by the method of claim 1.

16. The article of claim 15 wherein the article is a window blind slat.

* * * * *